United States Patent
Clift et al.

(10) Patent No.: US 8,990,704 B2
(45) Date of Patent: Mar. 24, 2015

(54) REMOTE USER INTERFACE MEDIA ADAPTER IN NETWORK BRIDGE

(75) Inventors: Graham Clift, El Cajon, CA (US); Jason Clement, San Diego, CA (US); Stephane Lejeune, San Diego, CA (US)

(73) Assignee: Sony Corporation, Tokyo (JP)

( * ) Notice: Subject to any disclaimer, the term of this patent is extended or adjusted under 35 U.S.C. 154(b) by 477 days.

(21) Appl. No.: 13/040,602

(22) Filed: Mar. 4, 2011

(65) Prior Publication Data

US 2012/0226992 A1 Sep. 6, 2012

(51) Int. Cl.
G06F 3/0481 (2013.01)
G06F 9/54 (2006.01)
H04L 29/08 (2006.01)

(52) U.S. Cl.
CPC .............. *G06F 9/541* (2013.01); *H04L 67/025* (2013.01)
USPC ............ 715/740; 715/733; 715/744; 715/745

(58) Field of Classification Search
CPC ..................................................... G06F 3/0481
USPC .......................................................... 715/740
See application file for complete search history.

(56) References Cited

U.S. PATENT DOCUMENTS

| 6,463,445 | B1 * | 10/2002 | Suzuki et al. .......................... 1/1 |
| 7,020,882 | B1 * | 3/2006 | Lewallen ....................... 719/328 |
| 7,370,074 | B2 * | 5/2008 | Alexander et al. ............ 709/203 |
| 7,505,889 | B2 * | 3/2009 | Salmonsen et al. ............. 703/23 |
| 7,577,559 | B2 * | 8/2009 | Lesser et al. .................... 703/23 |
| 2004/0054689 | A1 * | 3/2004 | Salmonsen et al. ........ 707/104.1 |
| 2004/0128365 | A1 * | 7/2004 | Motoyama et al. ........... 709/219 |
| 2006/0112188 | A1 * | 5/2006 | Albanese et al. ............. 709/238 |
| 2007/0005727 | A1 * | 1/2007 | Edwards et al. .............. 709/218 |
| 2007/0223481 | A1 * | 9/2007 | Sivakumar et al. ........... 370/392 |
| 2007/0239855 | A1 * | 10/2007 | Kellerman et al. ........... 709/218 |
| 2008/0052415 | A1 * | 2/2008 | Kellerman et al. ........... 709/246 |
| 2009/0006643 | A1 * | 1/2009 | Lee ................................ 709/231 |
| 2009/0006744 | A1 | 1/2009 | Cavallo et al. |
| 2009/0210488 | A1 * | 8/2009 | Lee ................................ 709/203 |
| 2010/0063989 | A1 * | 3/2010 | Mehta et al. .................. 709/202 |
| 2010/0219976 | A1 * | 9/2010 | Park et al. ................. 340/825.22 |
| 2010/0306312 | A1 * | 12/2010 | Ryu et al. ...................... 709/203 |
| 2011/0055716 | A1 * | 3/2011 | Kim et al. ..................... 715/740 |
| 2011/0060999 | A1 * | 3/2011 | So et al. ........................ 715/740 |
| 2011/0072359 | A1 * | 3/2011 | So et al. ........................ 715/744 |
| 2011/0154205 | A1 * | 6/2011 | Kim et al. ..................... 715/733 |
| 2011/0296313 | A1 * | 12/2011 | Gaxiola ........................ 715/744 |
| 2012/0016928 | A1 * | 1/2012 | Park et al. ..................... 709/203 |
| 2012/0054634 | A1 * | 3/2012 | Stone et al. ................... 715/745 |
| 2012/0096072 | A1 * | 4/2012 | So et al. ........................ 709/203 |
| 2012/0117145 | A1 * | 5/2012 | Clift et al. .................... 709/203 |
| 2012/0151327 | A1 * | 6/2012 | Jin et al. ........................ 715/234 |

(Continued)

OTHER PUBLICATIONS

Saito et al., "Wireless Gateway for Wireless Home AV Network and Its Implementation", IEEE Transactions on Consumer Electronics, vol. 47, No. 3, Aug. 1, 2001, pp. 496-501.

*Primary Examiner* — Reza Nabi
(74) *Attorney, Agent, or Firm* — Haverstock & Owens LLP

(57) ABSTRACT

A bridge including an adapter is able to transcode or translate different graphics languages to permit a variety of networked, dissimilar devices, to communicate. The bridge translates an existing application device's graphics/images into a Remote User Interface (Remote UI or RUI) graphics protocol of a rendering device and transmits the translated RUI to the rendering device. The rendering device is then able to display the translated RUI.

5 Claims, 3 Drawing Sheets

(56) References Cited

U.S. PATENT DOCUMENTS

| | | | |
|---|---|---|---|
| 2012/0159344 A1* | 6/2012 | Park et al. | 715/740 |
| 2012/0192230 A1* | 7/2012 | Algie et al. | 725/38 |
| 2012/0213069 A1* | 8/2012 | Oguchi | 370/231 |
| 2012/0233552 A1* | 9/2012 | Chee et al. | 715/745 |
| 2012/0254288 A1* | 10/2012 | Lejeune et al. | 709/203 |
| 2012/0254446 A1* | 10/2012 | Lejeune et al. | 709/227 |
| 2012/0254450 A1* | 10/2012 | Lejeune et al. | 709/228 |
| 2012/0254453 A1* | 10/2012 | Lejeune et al. | 709/230 |
| 2012/0254766 A1* | 10/2012 | Lejeune et al. | 715/740 |
| 2012/0299811 A1* | 11/2012 | Amendolagine et al. | 345/156 |
| 2013/0054827 A1* | 2/2013 | Feher et al. | 709/231 |
| 2014/0075015 A1* | 3/2014 | Chan et al. | 709/224 |

\* cited by examiner

REMOTE USER INTERFACE MEDIA ADAPTER IN NETWORK BRIDGE

FIELD OF THE INVENTION

The present invention relates to the field of user interfaces. More specifically, the present invention relates to a remote user interface media adapter in a network bridge.

BACKGROUND OF THE INVENTION

The number of electronic devices in people's homes is continually increasing. Many years ago, homes only had a radio; then, a radio and a television. The number of devices has increased to the point where a typical home has several televisions, stereos, computers, video game consoles, mobile phones/devices, appliances and others. Furthermore, these devices are gaining intelligence so that they are able to communicate with each other.

The expansion of residential networks to include a multiplicity of devices that can share files asynchronously and connect to the Internet through residential gateways was facilitated by the de-facto standard use of wired and wireless ethernet connectivity. Asynchronous sharing then started to give way to buffered streaming of video as bandwidth availability improved. This was closely followed by real time streaming. Networks employ quality of service to manage bandwidth resources and Universal Plug and Play (UPnP) to perform discovery and compatibility of compressed video content. Video UPnP also defines remote user input operation like play, stop and rewind so that video control as well as video display is able to be performed remotely. Also, provisions were made to support graphical transfer of a remote user interface, but no implementations on the market have made use of this. UPnP allowed for many different standards of compressed video, but does not, however, certify that a client supported the relevant decoder. Digital Living Network Alliance (DLNA) is a standards body formed to provide certified device compatibility for a specific subset of UPnP implementations. DLNA also defined the role of media servers, renderers, adapters, players and controllers.

A standard, referred to as Remote User Interface (RUI or Remote UI) is being developed to allow devices to operate each other and provide the user with a user interface that is configured appropriately for a device being used to control another device. For example, a user interface for a 46" wide television is not likely to appear properly on a mobile phone which has a display of 2". The Remote UI standard is a web-based protocol and framework for remote user interface on UPnP Networks and the Internet. The standard allows a UPnP-capable home network device to provide its interface (display and control options) as a web page to display on any other device coupled to the home network.

There are no well defined and widely accepted UPnP implementations for graphical RUI. One option, which has been backed by the UPnP Forum, is a browser based implementation known as CEA2014. The network client browser is considered to be heavy in flash, memory and/or processor requirements ('thick' client), whereas the network server application performs simple encapsulation of XML ('thin' server). In some situations this may be acceptable, like the case when rendering is performed by a personal computer and the application is run on a small mobile device, or a low end processing device, like a network router.

However, in the case of the home network where the rendering is done by a high definition TV, a Blu-Ray® player, a picture frame or a gaming machine, the use of a browser for RUI has some disadvantages. Firstly, a browser adds to the already substantial memory requirements of the renderers and so for these cost sensitive consumer electronics devices it may not be viable. Secondly, the processing speed requirements for a responsive experience are not going to be provided by the current range of devices available. And thirdly, the browser interface lends itself well to mouse and keyboard control, but is not necessarily the ideal format for a limited button remote control.

Also, the home network is able to include graphics applications built into game machines, video players, dongles and intelligent remotes on the low end, with cable boxes, cloud servers and multimedia PCs on the high end. To shoehorn all of these into one UPnP standard, it is clear that reach will be limited. In some cases substantial effort of rewriting or translation of the graphics application might be needed in order to fit the browser framework.

Another example of a proposed RUI is being provided through the RVU alliance. The RVU alliance was initiated by DirectTV in order to provide a pixel accurate remotely rendered version of their satellite decoder user interface. Unlike the browser based RUI, RVU uses a low level protocol that manipulates the graphics card framebuffer layers more directly. Instead of the script type messages that CEA2014 uses, RVU breaks up elements of the graphics into images that can be sent compressed or uncompressed over the network to be composited in the renderers screen buffers or off screen buffers as needed. Simple bit commands are sent over the network to allow the images to be stretched, cut and alpha-blended on the renderer side. This type of RUI would be considered a thin network client and thick network server because most of the computation effort would be with the application. Also, because most actions involve sending image data, this type of RUI uses a lot of network resources.

The advantage of RVU is that the low level graphics operations are able to be supported by all graphics cards quite easily and is not directly dependent on the type of application to be able to function. However, sometimes performance is a key parameter in usability, and as such the network load and network server performance could severely limit how useful the protocol is. RVU is especially vulnerable where complete screen refreshes are needed often, like 3D rotations of a view. A browser approach could handle this more simply through scripts of simple rotation commands. Another similar limitation is when the application is providing remote graphics to multiple renderers, and causes the application processor to run short of the necessary MIPS to perform adequately.

SUMMARY OF THE INVENTION

A bridge including an adapter is able to transcode or translate different graphics languages to permit a variety of networked, dissimilar devices, to communicate. The bridge translates an existing application device's graphics/images into a Remote User Interface (Remote UI or RUI) graphics protocol of a rendering device and transmits the translated RUI to the rendering device. The rendering device is then able to display the translated RUI.

In one aspect, a method of implementing a bridge comprises detecting a rendering device on a network, presenting existence information of the rendering device to an application device, opening a session between the application device and the rendering device and communicating a remote user interface between the application device and the rendering device using the session. The method further comprises presenting transcoding capabilities to the application device. The method further comprises performing additional processing to lessen a processing load on at least one of the application device and the rendering device. Opening the session is initiated by the application device. Communicating further comprises translating a command in a first remote user interface protocol into the command in a second remote user interface protocol. Translating further comprises receiving the command in the first remote user interface protocol and sending the command in the second remote user interface protocol. The first remote user interface protocol is different from the second remote user interface protocol. The bridge is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a television, a home entertainment system and an intelligent appliance.

In another aspect, a bridge device comprises a memory for storing an application, the application for detecting a rendering device on a network, presenting existence information of the rendering device to an application device and enabling communication of a remote user interface between the application device and the rendering device and a processing component coupled to the memory, the processing component for processing the application. The processor processes additional data received from at least one of the devices within the network. The application further presents transcoding capabilities to the application device. The application device and the rendering device implement disparate remote user interface protocols. The application receives a command in a first remote user interface protocol and sends the command in a second remote user interface protocol. An adapter in the bridge device monitors network traffic and application device/rendering device loading to make decisions about which type of remote user interface protocol to be used for optimal overall performance. The bridge device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a television, a home entertainment system and an intelligent appliance.

In another aspect, a network of devices comprises a first device implementing a first remote user interface protocol, a second device implementing a second remote user interface protocol and a bridge device implementing an adapter capable of communicating in the first protocol and the second protocol. The first device is an application device and the second device is a rendering device. The bridge device receives commands in the first remote user interface protocol from the first device and communicates the commands in the second remote user interface protocol to the second device. The first protocol and the second protocol are disparate protocols.

In yet another aspect, a system programmed in a controller in a device comprises a detecting module for detecting devices in a network; and an adapting module for translating a command in a first remote user interface protocol to the command in a second remote user interface protocol. The system further comprises a determining module for determining a protocol implemented by each of the devices. The device are selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a television, a home entertainment system and an intelligent appliance.

DETAILED DESCRIPTION OF THE PREFERRED EMBODIMENT

A device and method that extends a multi-technology bridge or router with media adapter functionality for both a graphics Remote User Interface (RUI) and video services to maximize the bandwidth usage and universal interconnectivity in the home is described herein. The method includes detecting multiple types of network interconnects and is able to expand Bluetooth®. The media adapter is able to be any media adapter, for example, as described in U.S. patent application Ser. No. 13/073,718, filed Mar. 28, 2011, titled "REMOTE USER INTERFACE ADAPTER," which is incorporated by reference herein. Additionally, the U.S. patent application Ser. No. 13/073,697, filed Mar. 28, 2011, titled, "TIERED HIERARCHICAL REMOTE USER INTERFACE," is incorporated by reference herein.

In the past, network/processor bandwidth limitations and the state of technology excluded the possibility of transcoding video and translating a graphics RUI on the network for the purpose of distributing content to rendering devices that have different technologies from an application server device. With the bridge described herein, transcoding video and translating an RUI are able to be implemented. Multi-technology bridges' and routers' capabilities are maximized by embedding video transcoding and graphics RUI translating services into these devices.

A network discoverable graphics and video media adapter included with a network bridge or router allows applications to detect all potential target rendering devices on the network. The rendering device may not inherently support the video or graphics capability of the application device, therefore transcoding takes place. Then, for example, if the home supports different types of home networks, such as WiFi-bg 2.4 gHz for some devices, WiFi-N 5 gHz for some and ethernet for others, the maximum bandwidth and flexibility is able to be offered if the transcoding is done inside of the bridge. Generating a target market for rendering devices that reside in one WiFi spectrum or that use a different IP networking technology such as Multimedia over Coax Alliance (MoCA), maximizes the potential benefit of placing the transcoding capabilities within a network bridge.

A networked application device that resides on one home Internet Protocol (IP) network discovers the video and graphical transcoder capabilities embedded within the media adapter included in a network bridge or router that resides on that network. The media adapter presents information about all available rendering devices that are coupled on the network. The media adapter also presents transcoding capabilities. The application device then opens up a session with a rendering device, making use of transcoding capabilities of the bridge.

Figure 1:
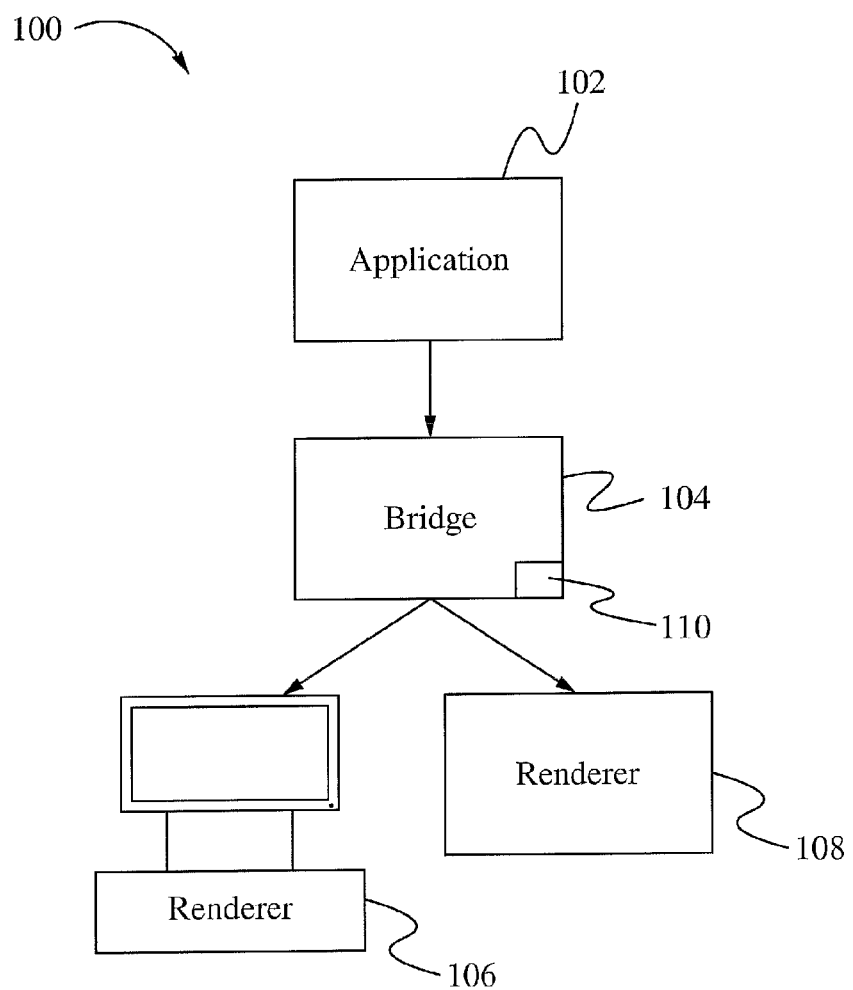
FIG. 1 illustrates a network of devices including a bridge for implementing an adapter according to some embodiments.

FIG. 1 illustrates a network of devices 100 including a bridge for implementing an adapter according to some embodiments. An application device 102, a bridge device 104 with an adapter 110, a first rendering device 106 and a second rendering device 108 are operatively coupled together.

The application device 102 is any device which is able to be used to communicate data such as an RUI and RUI commands to rendering devices. For example, the application device 102 is a mobile phone which is being used as a remote control for a television.

The first rendering device 106 (e.g. a television) and the second rendering device (e.g. a Blu-ray® player) 108 are any devices that render data for the purpose of displaying the data.

The bridge device 104 is any device which is able to be used to couple network segments and analyze incoming data packets to determine if the packet is able to be sent to another segment of a network. The bridge device 104 is also able to be a link to a larger network such as the Internet. The bridge device 104 includes an adapter 110. The adapter 110 is able to be implemented in software, hardware, firmware or any combination thereof. In some embodiments, the bridge device 104 is discoverable by other devices on the network.

The adapter 110 within the bridge device 104 transcodes or translates different graphics languages to permit a variety of networked, dissimilar devices, to communicate by partially rendering or translating an existing application's devices' graphics/images into a lower level RUI graphics protocol; where the RUI graphics protocol is delivered over the network to a rendering device (e.g. a PC with XII and a television with 2014). In some embodiments, the adapter monitors network traffic and application device/rendering device loading to make intelligent decisions about which type of RUI protocol should be used for optimal overall performance.

The adapter 110 is able to implement middleware such as a Blu-ray® disc Java stack. Additionally, the adapter 110 provides an adapter implementation which communicates in many different RUI protocols and interfaces. For example, the adapter 110 is able to receive a command in one RUI protocol and then output the command in a second RUI protocol so that a device that communicates based on the second RUI protocol is able to understand the command. As a further example, if the application device 102 attempts to send a command to the first rendering device 106, but the application device 102 communicates using OpenVG and the first rendering device 106 only accepts commands in OpenGL, then, typically, the devices would not be able to communicate. However, with the bridge device 104 using the adapter 110, the application device 102 sends the command in OpenVG to the bridge device 104 which uses the adapter 110 and translates the command into OpenGL and sends an OpenGL command to the first rendering device 106 which is able to receive the OpenGL command. Although a command is described herein, any information is able to be sent, translated and the re-sent. In some embodiments, the bridge device 104 is able to perform rendering processing or other processing to help with the processing load on the network.

In some embodiments, the network of devices 100 includes a network. The network is able to be any type of network such as a Local Area Network (LAN), a Wide Area Network (WAN), the Internet, a network of networks or any other network. Additionally, the type of network is able to be wireless, wired, cellular, any other type of network or any combination of two or more networks.

Although the network of devices 100 of FIG. 1 includes one application device, one bridge device and two rendering devices, any number of devices are able to be included in a network (e.g. multiple application devices and one rendering device).

Figure 2:
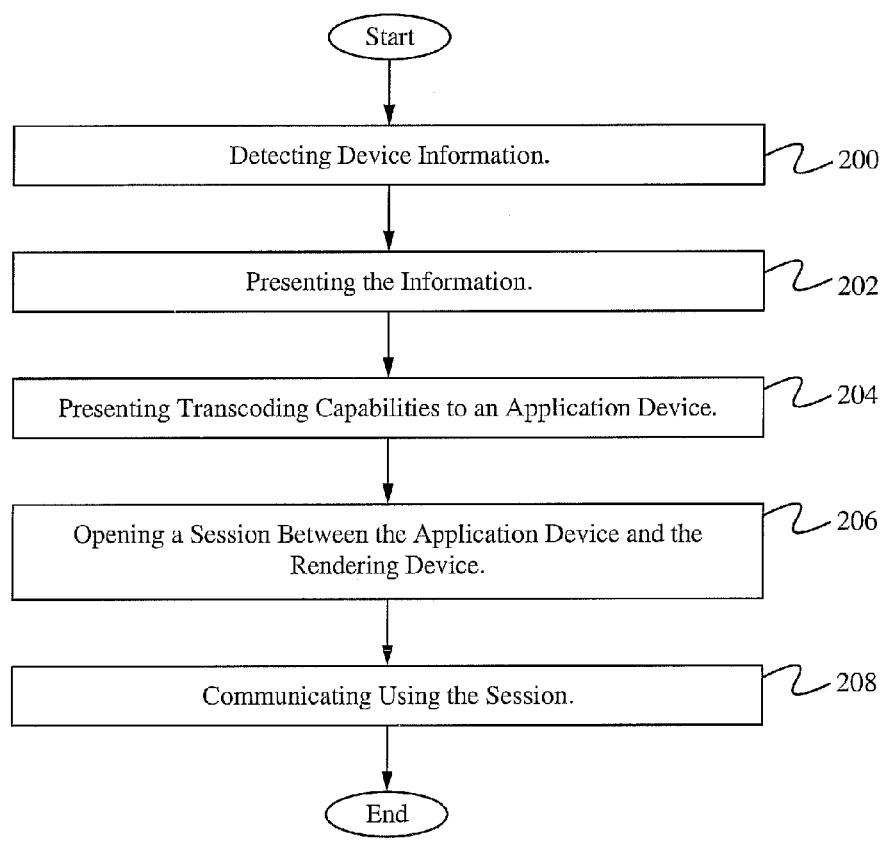
FIG. 2 illustrates a flowchart of a method of utilizing a bridge according to some embodiments.

FIG. 2 illustrates a flowchart of a method of utilizing a bridge according to some embodiments. In the step 200, the bridge with the adapter detects information about application devices and/or rendering devices. For example, the adapter detects the existence of the devices on the network and determines the protocols implemented by the devices. Additional information is able to be detected as well. In the step 202, the bridge with the adapter presents existence information about the detected devices to each of the detected devices. For example, the detected rendering device information is sent to an application device. In the step 204, the bridge with the media adapter presents transcoding capabilities to the application device. For example, if the rendering device utilizes a different protocol than the protocol of the application device, the adapter presents its ability to transcode the protocols. In some embodiments, the step 204 is able to be skipped. In the step 206, the application device opens a session with a rendering device, making use of the transcoding capabilities of the bridge using the adapter. For example, if a rendering device protocol utilizes protocol X and an application device utilizes protocol Y, the adapter enables the application device to communicate with the rendering device by transcoding the data from one protocol to a second protocol. In the step 208, the application device and the rendering device communicate through the open session. The rendering device displays the data communicated (e.g. a television displays an RUI). In some embodiments, the bridge also performs processing to lessen a processing load of a device in the network. For example, if a game for a gaming console has heavy video processing requirements, some of the processing is able to be performed on the bridge. Although specific steps are described, in some embodiments, fewer or more steps are included, and/or the order of the steps is able to be changed.

Figure 3:
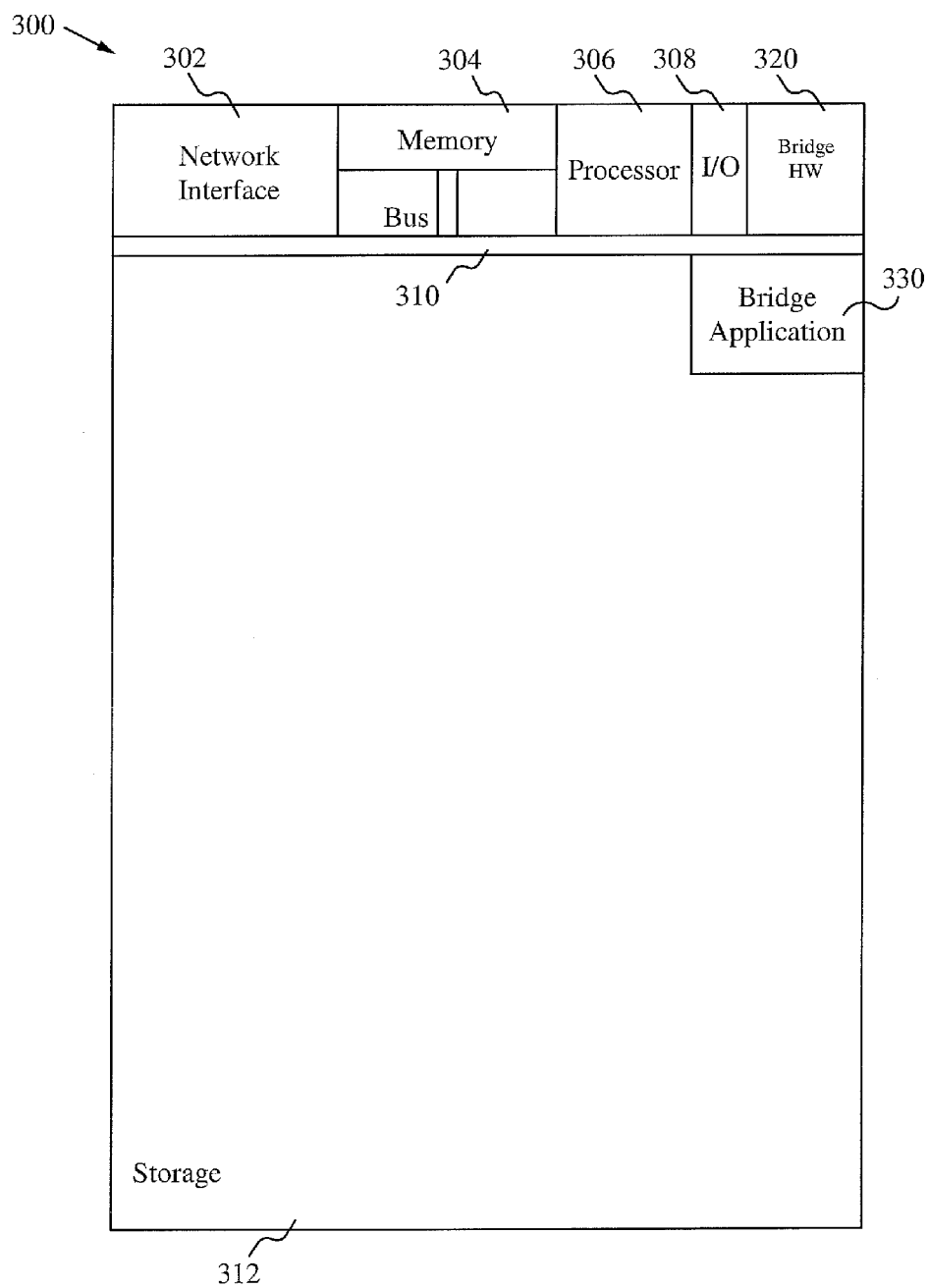
FIG. 3 illustrates a block diagram of an exemplary bridge computing device according to some embodiments.

FIG. 3 illustrates a block diagram of an exemplary bridge computing device 300 according to some embodiments. The computing device 300 is able to be used to acquire, store, compute, communicate and/or display information. For example, the computing device 300 is able to acquire, store, transcode/translate and implement commands in disparate protocols. For example, the computing device 300 receives a command from a device in a first protocol and sends the command in a second protocol to another device that utilizes the second protocol. Although, the adapter translating commands is a possible implementation, the adapter is also able to receive, process and send commands in the same protocol (e.g. when two devices implement the same protocol). The computing device 300 is also able to provide additional processing power to assist in other devices' processing. In general, a hardware structure suitable for implementing the computing device 300 includes a network interface 302, a memory 304, a processor 306, I/O device(s) 308, a bus 310 and a storage device 312. The choice of processor is not critical as long as a suitable processor with sufficient speed is chosen. The memory 304 is able to be any conventional computer memory known in the art. The storage device 312 is able to include a hard drive, CDROM, CDRW, DVD, DVDRW, Blu-ray®, flash memory card or any other storage device. The computing device 300 is able to include one or more network interfaces 302. An example of a network interface includes a network card connected to an Ethernet or other type of LAN. The I/O device(s) 308 are able to include one or more of the following: keyboard, mouse, monitor, display, printer, modem, touchscreen, button interface and other devices. Remote user interface bridge application(s) 330 used to perform the remote user interface bridge operations are likely to be stored in the storage device 312 and memory 304 and processed as applications are typically processed. More or less components shown in FIG. 3 are able to be included in the computing device 300. In some embodiments, remote user interface bridge hardware 320 is included. Although the computing device 300 in FIG. 3 includes applications 330 and hardware 320, the remote user interface bridge operations are able to be implemented on a computing device in hardware, firmware, software or any combination thereof. For example, in some embodiments, the remote user interface bridge applications 330 are programmed in a memory and executed using a processor. In another example, in some embodiments, the remote user interface bridge hardware 320 is programmed hardware logic including gates specifically designed to implement the remote user interface bridge operations.

In some embodiments, the remote user interface bridge application(s) 330 include several applications and/or modules. As described herein, a device detection module for detecting/discovering devices and an adapting module for translating/transcoding information or commands from one protocol to another protocol are implemented. In some embodiments, there are additional modules or sub-modules such as a presenting module for presenting detection information, a transcoding capability module for presenting transcoding capabilities and a session module for opening a session between application devices and rendering devices. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television, a home entertainment system or any other suitable computing device. In some embodiments, a computing device is able to include intelligent appliances such as a refrigerator, a toaster, a toaster oven and a microwave, where the appliances are able to process and/or present information.

To utilize the bridge, a user incorporates the bridge in a network by coupling the bridge to the devices in the network. The coupling is able to be wired, wireless or a combination thereof. Depending on the implementation, the bridge determines the protocols implemented by the devices on the network and performs the adapting (also referred to as translating) from one protocol to another, so that commands are able to be transmitted/received by devices with similar or disparate protocols. The determining and adapting is able to occur automatically or manually depending on the implementation. Although it has been generally described that a command is translated into another protocol, the command is able to be translated into several protocols. For example, if a user wants to turn on many devices, but each device implements a different RUI protocol than a controlling device, the bridge is able to translate the command into many different protocols at the same time so that the devices all turn on. From a user's perspective, the user generally does not notice that the bridge is functioning aside from disparate devices being able to communicate and devices functioning more efficiently with the processor load being shared with the bridge.

In operation, the bridge determines protocols implemented by devices being communicated with. If the devices implement the same protocol, then the bridge passes any communications sent from one device to the other device. However, if the devices implement disparate protocols, the bridge is able to translate from one protocol to another so that the devices are able to communicate. The bridge is also able to process commands or perform computations to lighten a processing load of another device such as a rendering device.

The devices implemented within the network described herein are able to implement Digital Living Network Alliance (DLNA) standard as well.

Some Embodiments of Remote User Interface Media Adapter in Network Bridge

1. A method of implementing a bridge comprising:
   a. detecting a rendering device on a network;
   b. presenting existence information of the rendering device to an application device;
   c. opening a session between the application device and the rendering device; and
   d. communicating a remote user interface between the application device and the rendering device using the session.

2. The method of clause 1 further comprising presenting transcoding capabilities to the application device.

3. The method of clause 1 further comprising performing additional processing to lessen a processing load on at least one of the application device and the rendering device.

4. The method of clause 1 wherein opening the session is initiated by the application device.

5. The method of clause 1 wherein communicating further comprises translating a command in a first remote user interface protocol into the command in a second remote user interface protocol.

6. The method of clause 5 wherein translating further comprises receiving the command in the first remote user interface protocol and sending the command in the second remote user interface protocol.

7. The method of clause 6 wherein the first remote user interface protocol is different from the second remote user interface protocol.

8. The method of clause 1 wherein the bridge is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a television, a home entertainment system and an intelligent appliance.

9. A bridge device comprising:
   a. a memory for storing an application, the application for:
      i. detecting a rendering device on a network;
      ii. presenting existence information of the rendering device to an application device; and
      iii. enabling communication of a remote user interface between the application device and the rendering device; and
   b. a processing component coupled to the memory, the processing component for processing the application.

10. The bridge device of clause 9 wherein the processor processes additional data received from at least one of the devices within the network.

11. The bridge device of clause 9 wherein the application further presents transcoding capabilities to the application device.

12. The bridge device of clause 9 wherein the application device and the rendering device implement disparate remote user interface protocols.

13. The bridge device of clause 9 wherein the application receives a command in a first remote user interface protocol and sends the command in a second remote user interface protocol.

14. The bridge device of clause 9 wherein an adapter in the bridge device monitors network traffic and application device/rendering device loading to make decisions about which type of remote user interface protocol to be used for optimal overall performance.

15. The bridge device of clause 9 wherein the bridge device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a television, a home entertainment system and an intelligent appliance.

16. A network of devices comprising:
   a. a first device implementing a first remote user interface protocol;
   b. a second device implementing a second remote user interface protocol; and
   c. a bridge device implementing an adapter capable of communicating in the first protocol and the second protocol.

17. The network of devices of clause 16 wherein the first device is an application device and the second device is a rendering device.

18. The network of devices of clause 16 wherein the bridge device receives commands in the first remote user interface protocol from the first device and communicates the commands in the second remote user interface protocol to the second device.

19. The network of devices of clause 16 wherein the first protocol and the second protocol are disparate protocols.

20. A system programmed in a controller in a device comprising:
   a. a detecting module for detecting devices in a network; and
   b. an adapting module for translating a command in a first remote user interface protocol to the command in a second remote user interface protocol.

21. The system of clause 20 further comprising a determining module for determining a protocol implemented by each of the devices.

22. The system of clause 20 wherein the device are selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a television, a home entertainment system and an intelligent appliance.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A bridge device comprising:
   a. a memory for storing an application, the application for:
      i. detecting a rendering device and additional devices on a network, and determining protocols implemented by the rendering device and the additional devices;
      ii. presenting existence information of the rendering device and transcoding capabilities of an adapter in the bridge device to an application device and the additional devices; and
      iii. enabling communication of a remote user interface between the application device and the rendering device, wherein enabling communication further comprises translating a command in a first remote user interface protocol into the command in a lower level remote user interface protocol, wherein the command is translated into a plurality of protocols, wherein enabling communication further comprises monitoring network traffic and application device and rendering device loading to make intelligent decisions about which remote user interface protocol to use for optimal performance; and
   b. a processing component coupled to the memory, the processing component for processing the application, wherein the bridge device couples network segments and analyzes incoming data packets to determine if the data packets are able to be sent to another segment of the network, wherein the application device and the rendering device implement disparate remote user interface protocols.

2. The bridge device of claim 1 wherein the processor processes additional data received from at least one of the devices within the network.

3. The bridge device of claim 1 wherein the application further presents transcoding capabilities to the application device.

4. The bridge device of claim 1 wherein the application receives the command in the first remote user interface protocol and sends the command in a second remote user interface protocol.

5. The bridge device of claim 1 wherein the bridge device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a television, a home entertainment system and an intelligent appliance.

* * * * *